US006636647B1

(12) United States Patent
Ohki et al.

(10) Patent No.: US 6,636,647 B1
(45) Date of Patent: Oct. 21, 2003

(54) METHOD AND APPARATUS FOR MERGING DATA AND MEDIUM FOR PROVIDING PROGRAM FOR MERGING DATA

(75) Inventors: Mitsuharu Ohki, Tokyo (JP); Kyoko Nakamura, Tokyo (JP); Takashi Totsuka, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/330,357

(22) Filed: Jun. 11, 1999

(30) Foreign Application Priority Data

Jun. 17, 1998 (JP) .......................................... P10-170384
Sep. 30, 1998 (JP) .......................................... P10-278991

(51) Int. Cl.$^7$ ................................................. G06K 9/36
(52) U.S. Cl. ........................ 382/284; 382/190; 345/629
(58) Field of Search ................................. 382/284, 190, 382/191, 201, 206, 240, 263, 173, 283, 266; 348/626, 571, 645, 630; 345/626, 629, 639, 645

(56) References Cited

U.S. PATENT DOCUMENTS 5,124,786 A * 6/1992 Nikoh ......................... 348/645
5,264,932 A * 11/1993 Haendle et al. ............. 348/571

* cited by examiner

*Primary Examiner*—Bhavesh M. Mehta
*Assistant Examiner*—Kanji Patel
(74) *Attorney, Agent, or Firm*—Bell, Boyd & Lloyd, LLC

(57) ABSTRACT

A first original image and a second original image are input to create a merged image. A superimpose area, which an operator designates using an input device, is set as a superimpose area. A portion of the first original image to be superimposed is determined. A superimposing process is executed by blending the first original image with the merged image with a weighted average. The setting of the superimpose area is to determine an α value indicative of the degree of blend (weight) between the first original image and the merged image. The α value of a portion independently present to the side of the second original image with respect to a center line is forced to be zero. The first original image is superimposed onto the merged image using the determined α value.

37 Claims, 19 Drawing Sheets

PRIOR ART

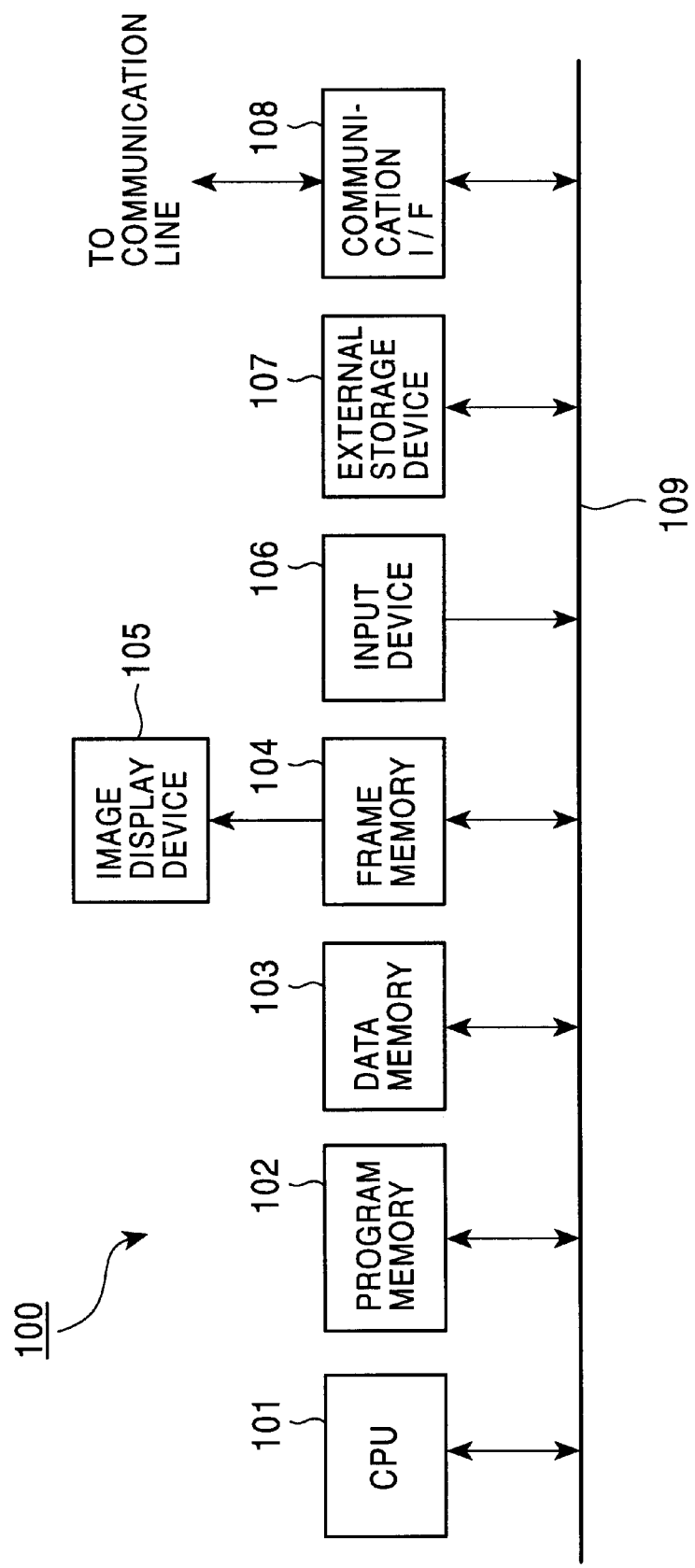

CHARACTER a

CHARACTER b 702  701  703  701  702

METHOD AND APPARATUS FOR MERGING DATA AND MEDIUM FOR PROVIDING PROGRAM FOR MERGING DATA

BACKGROUND OF THE INVENTION

1. Field of the Invention

The present invention relates to a method and apparatus for smoothly merging data such as image data. The present invention also relates to a medium for providing a data merging program for the data merging method.

2. Description of the Related Art

Multi-resolution-based techniques are available as a method for splicing two or more images into a single image having a smooth splice. These techniques are described in a paper authored by Peter J. Burt et al., entitled "A Multiresolution Spline With Application to Image Mosaics," ACM Trans. on Graphics, Vol. 2, No. 4, October 1983, pp. 217–236, and in a paper authored by Peter J. Burt, entitled "Fast Filter Transforms for Image Processing", Computer Graphics and Image Processing, 16, 1981, pp. 20–51. The method using the multi-resolution techniques described in these papers include following three steps.

In a first step, each image is divided by spatial frequency band. A set of divided images is called a Laplacian pyramid. In a second step, the images of different frequency components are blended for splicing according to weighted average. In a third step, the set of images spliced according to the frequency component is summed to form a merged image.

The Laplacian pyramid is a set of images that are divided according to spatial frequency band. A method of creating the Laplacian pyramid is briefly discussed.

An original image is low-pass filtered using a reduce operation to produce a set of images called a Gaussian pyramid. The reduce operation here refers to an operation in which the original image is low-pass filtered to reduce a sample density of the image.

When the original image is subjected to the reduce operation once, image data at a first layer of the Gaussian pyramid is created. Another reduce operation, if executed, creates image data at a second layer of the Gaussian pyramid. The reduce operation is iterated to create image data of further layers. The original data is called a zero-layer image data. The higher the hierarchical layer in the Gaussian pyramid, the lower the frequency component of the image becomes as a result of low pass filtering.

Using the Gaussian pyramid thus constructed and an expand operation, the Laplacian pyramid is created. The expand operation is an operation reverse to the reduce operation. The "image data at the i-th layer of the Laplacian pyramid" is created by subtracting the "image data that is obtained by subjecting once the image data at (i+1)-th layer of the Gaussian pyramid to the expand operation" from the "image data at an i-th layer of the Laplacian pyramid".

The image data at each layer in the Laplacian pyramid is the one, having a particular frequency band, picked up from the original image data. As the layer moves upward in the Laplacian pyramid, the image has a lower frequency band.

The Laplacian pyramid, the Gaussian pyramid, the reduce operation and the expand operation have been discussed. A detailed discussion about them is provided in the two above-cited papers.

The image merging using the multi-resolution techniques disclosed in the above-cited papers is now discussed.

The images are merged on the basis of the frequency component according to the cited merging method. The size of each merging area is different from frequency component to frequency component. In a low-frequency component, namely, a high layer in the Laplacian pyramid, two images are blended with respective weights in a wide merge area, while in a high-frequency component, namely, a low layer in the Laplacian pyramid, two images are blended with respective weights in a narrow merge area. The merge area in the low-frequency is set to be wide because of the following reason: if the images having a direct current component (the extreme case of low-frequency components) are spliced in a narrow area, a discontinuity stands out, and the images are thus allowed to mildly vary in a wide area for splicing. The merge area in the high-frequency component is set to be narrow. The high-frequency components at an edge or other features, if blended in a wide area, are blurred and look like double exposures.

In accordance with the merging method using the multi-resolution techniques, in the low-frequency component, namely, the high layers in the Laplacian pyramid, two images are blended with respective weights in a wide merge area. The lower the frequency component, the wider the merge area. At the lowest frequency band, namely, in the topmost layer in the Laplacian pyramid, the size of the merge area extends to the entire original image.

If images formed of elements having extremely varying aspect ratios, such as images of the hair, are merged using the above-referenced merging method, a natural looking merging is difficult.

Now, one single hair stands out among a plurality of hairs. The outstanding one single hair means that the edge of the one single hair looks distinct because of the lighting conditions. Such a hair contains a great deal of high-frequency components, and data about it is placed in a low layer in the Laplacian pyramid. The hair is thus blended in a narrow area in the center of the merge area. Specifically, the above merging method results in an unnatural-looking image in which the outstanding hair extending from one side disappears abruptly in the center.

Now, an original image shown in FIG. 1A and an original image shown in FIG. 1B are merged at the center of the screen.

FIG. 1A and FIG. 1B are images of elements such as the hair, featuring extremely varying aspect ratios. Some elements (hairs) are distinct while other elements (hairs) are less distinct.

Referring to FIG. 1A, black stripes (a1, a2, a3 and a4) are distinct elements (hairs). The blank portion indicates less distinct elements, which are not shown in FIG. 1A because they are not important in the context of the present invention. Similarly, black stripes (b1, b2, b3, and b4) shown in FIG. 1B are distinct elements (hairs). The blank portion indicates less distinct elements, which are not shown in FIG. 1B because they are not important in the context of the present invention.

FIG. 1C shows a merged image C, into which the original image shown in FIG. 1A and the original image shown in FIG. 1B were merged in accordance with the conventional data merging method. Since the distinct elements (hairs) contain a great deal of high-frequency components in the merged image, the elements abruptly increase in number near the center (at a vertically aligned dotted line cc, which does not appear in the real image).

Elements a1, a2, and a4 shown in FIG. 1A become ca1, ca2, and ca4, respectively, as shown in FIG. 1C, and ca1, ca2, and ca4 appear only on the left half of the screen. Since a3 does not appear on the left half as shown in FIG. 1A, it does not appear in FIG. 1C, either. Elements b1, b2, b3, and b4 shown in FIG. 1B become cb1, cb2, cb3, and cb4 as shown in FIG. 1C, and cb1, cb2, cb3, and cb4 appear only on the right half.

SUMMARY OF THE INVENTION

Accordingly, it is an object of the present invention to provide a method and apparatus for merging a plurality of data in a natural looking manner.

It is another object of the present invention to provide a medium for providing a program for the data merging method.

According to one aspect of the present invention, a method for merging a plurality of data includes the extracting step of extracting at least one of the high-frequency component of first data and the high-frequency component of second data, and the synthesizing step of determining a composite value of the first data and the second data in accordance with at least one of the amount of the high-frequency component of the first data and the amount of the high-frequency component of the second data.

According to another aspect of the present invention, an apparatus for merging a plurality of data, includes an extracting unit for extracting at least one of the high-frequency component of first data and the high-frequency component of second data, and a synthesizing unit for determining a composite value of the first data and the second data in accordance with at least one of the amount of the high-frequency component of the first data and the amount of the high-frequency component of the second data.

According to yet another aspect of the present invention, a medium for provides a program for merging a plurality of data. The program includes the extracting step of extracting at least one of the high-frequency component of first data and the high-frequency component of second data, and the synthesizing step of determining a composite value of the first data and the second data in accordance with at least one of the amount of the high-frequency component of the first data and the amount of the high-frequency component of the second data.

BRIEF DESCRIPTION OF THE DRAWINGS

FIG. 7 is a block diagram of an image data merging apparatus for carrying out a processing program for the image data merging method;

DESCRIPTION OF THE PREFERRED EMBODIMENTS

Figure 1A:
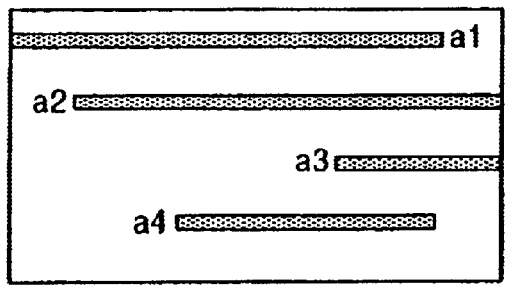
FIGS. 1A through 1C illustrate a conventional method for merging image data.
Figure 1B:
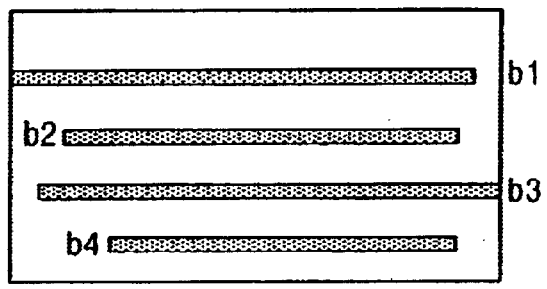

Referring to the drawings, the embodiments of the present invention are now discussed in detail.

Figure 2A:
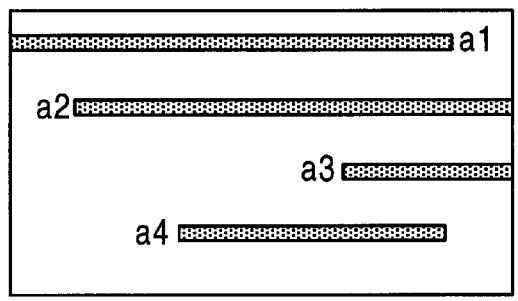
FIGS. 2A through 2C diagrammatically shows one embodiment of the image merging method of the present invention.
Figure 2B:
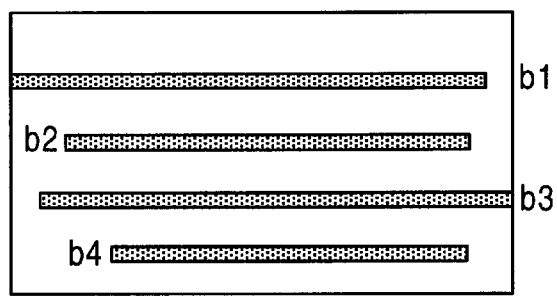
Figure 2C:
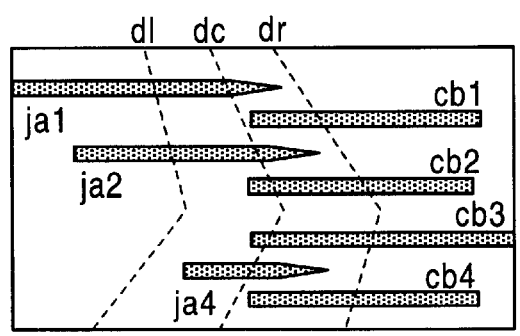

In one embodiment of image data merging method of the present invention, an original image A shown in FIG. 2A and an original image B shown in FIG. 2B are merged near a center line to obtain a merged image shown in FIG. 2C.

Images shown in FIG. 2A and FIG. 2B are a set of elements such as the hair, having extremely varying aspect ratios. In the image, some elements (hairs) ate distinct, while other elements (hairs) are less distinct.

Referring to FIG. 2A, black stripes (a1, a2, a3, and a4) are distinct elements (hairs). The blank portion indicates less distinct elements, which are not shown in FIG. 2A because they are not important in the context of the present invention. Similarly, black stripes (b1, b2, b3, and b4) shown in FIG. 2B are distinct elements (hairs). The blank portion indicates less distinct elements, which are not shown in FIG. 2B because they are not important in the context of the present invention.

Figure 1C:
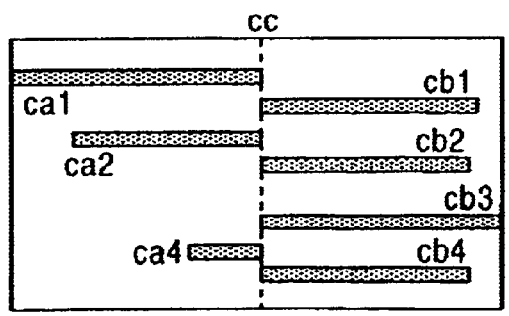

FIG. 2C shows a merged image C, into which the original image shown in FIG. 2A and the original image shown in FIG. 2B were merged in accordance with the data merging method of the present invention. Rather than disappearing near the center line cc in accordance with the conventional image data merging method as shown in FIG. 1C, elements ca1, ca2, and ca4 continue to appear as ja1, ja2, and ja4, respectively. The elements do not suddenly disappear at dr, either.

Figure 3:
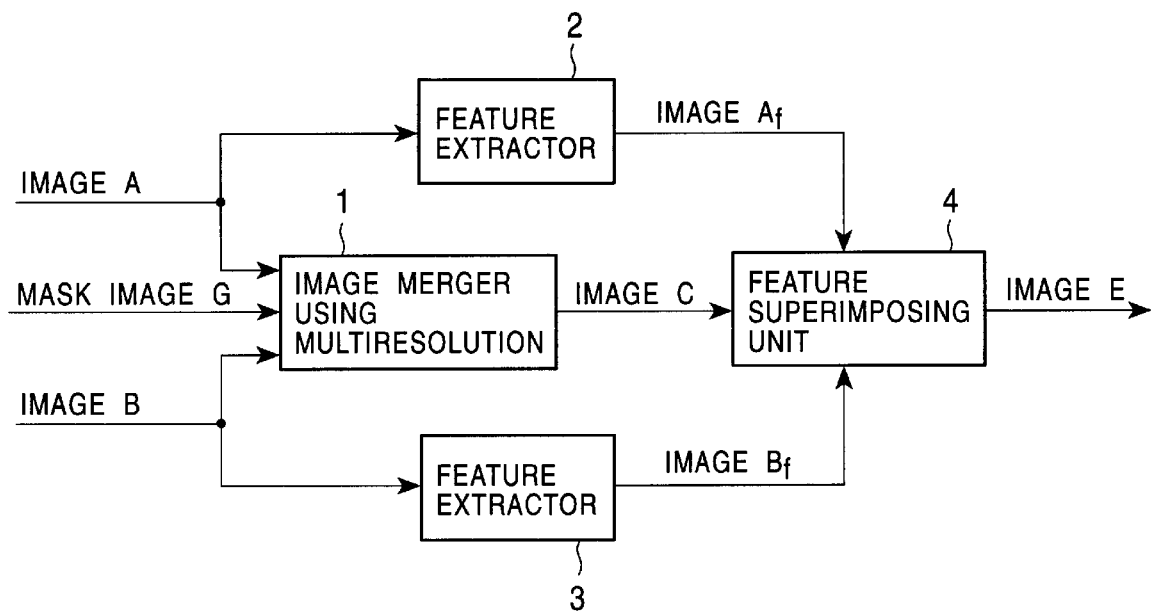
FIG. 3 is a functional block diagram of the image data merging method of the present invention.
Figure 4:
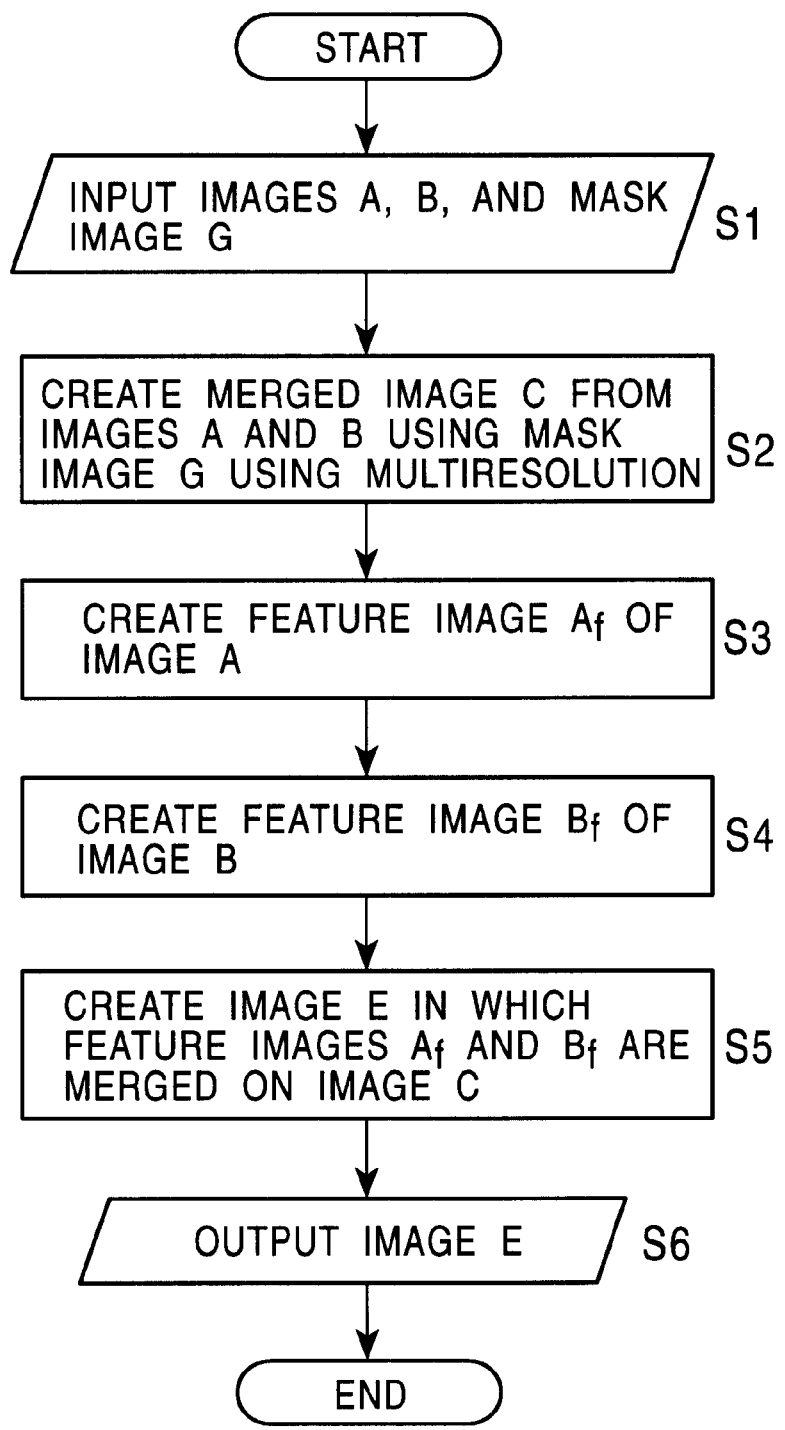
FIG. 4 is a flow diagram illustrating a series of processing steps of the image data merging process.

The image data merging method of the present invention is now discussed. FIG. 3 is a functional block diagram illustrating the flow of information in the image data merging method. Referring to FIG. 3, the image data merging method is carried out by blocks including an image merger 1 for merging two input images A and B, as an object to be merged, on a mask image G using the multi-resolution techniques, feature extractors 2 and 3 for extracting features from the image A and the image B, respectively, and a superimposing unit 4 for superimposing a feature image Af and a feature image Bf, respectively, from the feature extractors 2 and 3, onto a merged image C provided by the image merger 1. Referring to FIG. 4, in accordance with the image data merging method, two images A and B, as an object to be merged, and a mask image G are received in step S1. In step S2, the image A and the image B are merged on the mask image G using the multi-resolution techniques. The mask image G shows an area where the image A overlaps the image B when the components at the lowest spatial frequency band are merged. The mask image is input, as necessary, when features are extracted from the image A and the image B or when the features are superimposed. In step S3, an outstanding element (feature) such as the hair is extracted from the image A to create the feature image Af. The same process is performed on the image B. In step S4, an outstanding element is extracted from the image to create the feature image Bf. In step S5, the feature image Af and the feature image Bf are superimposed on the merged image C. In step S6, an image E is output. A series of processing steps end here.

An image data merging apparatus shown in FIG. 7 executes a processing program for the image data merging method. The image data merging apparatus shown in FIG. 7 will be discussed in more detail later.

The process of for the image data merging method is now specifically discussed. The image data merging method starts with a high-frequency component detecting step for picking up a high-frequency component from image data. As described above, the images of outstanding features shown in FIG. 2A and FIG. 2B are obtained by extracting features from the images.

Figure 5A:
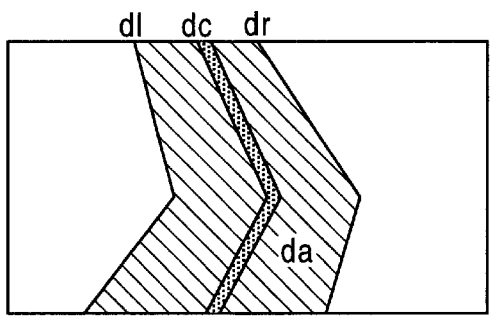
FIGS. 5A through 5C illustrate intermediate processes for generating a merged image.

In a superimpose area setting step, an operator designates a superimpose area by manipulating an input device such as a mouse or a keyboard. FIG. 5A shows a superimpose area da, a hatched area, designated by the operator and set in the superimpose area setting step. The superimpose area da is defined by a left edge dl and a right edge dr with a center line dc running in the superimpose area da. Typically, dc agrees with the center line cc of merge for creating the merged image C shown in FIG. 1C. To indicate that the present invention is not limited to this, dc is intentionally drawn in a position different from that of cc. As long as dc is generally identical to cc, it is acceptable. As shown in FIGS. 5A–6C, dl, dc, and dr, represented by dotted lines, are shown for purposes of discussion, and are not really present.

Figure 5B:

The positions of outstanding elements, namely, ea1, ea2, ea3, and ea4, in the original image A in the superimpose area are determined as shown in FIG. 5B. FIG. 5A shows the portions of a1, a2, a3, and a4, shown in FIG. 2A, falling within the superimpose area da. In this position detection method, the high-frequency components of the original image A above a particular "threshold" are detected as a position of an outstanding element. This detection method needs no operator's manual intervention for selection.

Figure 5C:
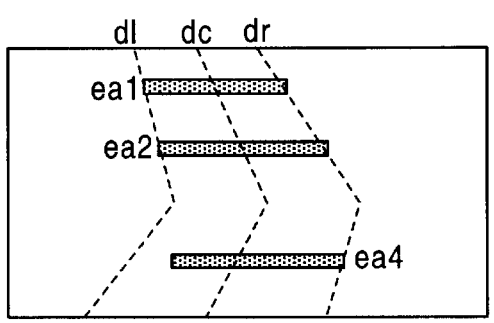

Detected but unnecessary positions are then deleted after the positions of the outstanding elements are detected within the superimpose area shown in FIG. 5B. FIG. 5C shows the positions of the outstanding elements after the deletion of unnecessary positions. Referring to FIG. 5C, ea3, present in FIG. 5B, is deleted. The outstanding elements to be superimposed on the merged image C are thus selected from the original image A shown in FIG. 1A. The superimposing is performed to prevent the outstanding elements appearing to the left of cc from abruptly disappearing near cc as shown in FIG. 1C. Specifically, treating only the outstanding elements having their portion to the left of cc is sufficient. It is not necessary to superimpose an outstanding element present to the right of cc. Since cc is generally identical to dc, the following point is derived from the above discussion.

Among the detected positions shown in FIG. 5B, a element present only to the right of dc, such as ea3, can be deleted. The result of the deletion is shown in FIG. 5C.

Figure 6A:
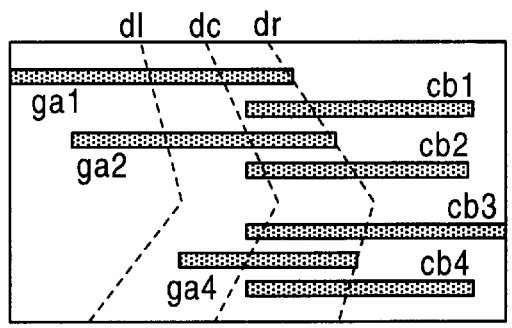
FIGS. 6A through 6C illustrate other intermediate processes for generating a merged image.

A write step is performed to write merged data shown in FIG. 1C onto the image shown in FIG. 5C. FIG. 6A shows an image in which the original image A, only at the positions shown in FIG. 5C, is superimposed on, or is substituted, for the merged image C shown in FIG. 1C. As seen from FIG. 6A, ca1, ca2, and ca4 become ga1, ga2, and ga4, respectively, rather than disappearing near cc as shown in FIG. 1C.

If a portion of the high-frequency component of the original image A is above a particular threshold in the superimpose area da, that portion is detected as the position of the outstanding element. In this way, the positions of the outstanding elements are detected, and any elements present only to the right of the center dc of the superimpose area are deleted, and a position to be superimposed is thus determined. With this arrangement, the outstanding elements in the original image are prevented from disappearing in the vicinity of cc.

As seen from FIG. 6A, the outstanding elements (ga1, ga2, and ga4) disappear at dr. For this reason, outputting the image shown in FIG. 6A as an output image is not preferred.

The selection method of the positions of the outstanding elements, described with reference to FIG. 5B and FIG. 5C, is now improved. To this end, a weight calculation step is performed to calculate the weight for each position within the superimpose area, based on the corresponding high-frequency component.

The image shown in FIG. 5B shows the positions of the outstanding elements that are obtained by detecting a portion of the high-frequency component in the original image A above the particular threshold, as a position of an outstanding element.

Figure 6B:
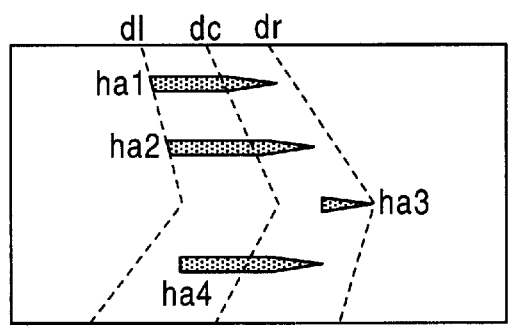

In this step, the threshold is made variable depending on the distance from dl. For example, the distance from dl increases, the threshold monotone increases. The lower the threshold, the more the positions of the outstanding elements are detected. Conversely, the higher the threshold, the less the positions of the outstanding elements are detected. As it gets farther from dl and nearer to dr, detection conditions becomes more severe. The positions of the outstanding elements are difficult to detect. FIG. 6B shows the positions of the outstanding elements that are detected with the threshold varying with the distance. Instead of ea1, ea2, ea3, and ea4 shown in FIG. 5B, the detected positions, detected as the outstanding elements, ha1, ha2, ha3, and ha4 gradually taper off toward their right ends.

Figure 6C:
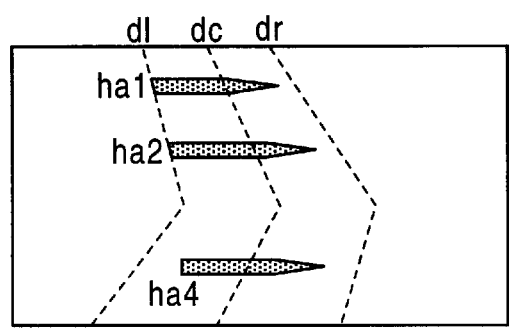

In the same manner that FIG. 5C is derived from FIG. 5B, ha3, appearing only to the right of dc, is deleted in FIG. 5B. The result, subsequent to the deletion, is shown in FIG. 6C. As shown in FIG. 6C, ha1, ha2, and ha4 show the positions at which the original image A needs to be superimposed.

In the merged image C, the original image A, at only the positions shown in FIG. 6C, is used for superimposing, namely, is substituted, as shown in FIG. 2C. As seen from FIG. 2C, ca1, ca2, and ca4 become ja1, ja2, and ja4, respectively, rather than abruptly disappearing in the vicinity of cc as shown in FIG. 1C. Furthermore, the elements ha1, ha2, and ha4 are prevented from abruptly disappearing at dr.

In this way, the threshold is varied in accordance with the distance from dl in the superimpose area. The portion of the high-frequency component of the original image above the threshold is detected as the position of the outstanding element. The element, present only to the right of the center dc of the superimpose area, is deleted. The position of the outstanding element to be superimposed is finally obtained. With this arrangement, the outstanding element of the original image A is prevented from abruptly disappearing in the vicinity of cc. The outstanding element is also prevented from abruptly disappearing at dr.

The above operation is equally applied to the original image B. Referring to FIGS. 6A and 2C, cb1, cb2, cb3, and cb4 remain unchanged from the merged image C. In practice, however, the same operation is performed to select a portion of the original image B to be superimposed. The selected positions are then superimposed on the images shown in FIGS. 6A and 2C so that the outstanding elements in the original image B are prevented from abruptly disappearing.

If a determination is made of which of the data of the merged image C or the data of the original image A (the original image B) is used in each position in order to superimpose the outstanding elements, the border between the superimposed area and non-superimposed area is distinctly presented, causing an unnatural image. The superimposed image is preferably blended using a weighted average. In other words, the merged image C and the original image A (the original image B) are synthesized using a software key rather than a hardware key.

This operation is discussed in more detail referring to an equation. The image at each position is calculated using a position function $\alpha(x,y)$ $(0 \leq \alpha 1)$, $$D(x,y)=\alpha(x,y){\times}A(x,y)+\{1-\alpha(x,y)\}{\times}C(x,y)$$

Output image D is thus obtained. At position (x,y) giving $\alpha(x,y)=1$, the original image A is fully superimposed, namely, is fully substituted.

Referring to FIG. 7 through FIG. 19, the image data merging method is discussed in detail. The program of the image data merging method is executed by the image data merging apparatus shown in FIG. 7.

As shown in FIG. 7, an image data merging apparatus 100 includes a processing circuit 101 for executing the processing program, a program memory 102 for storing a processing program, a data memory 103 for storing data to be processed, a frame memory 104 for storing image data to be merged and image data already merged, an image display device 105 for displaying the image data stored in the frame memory 104, an input device 106 such as a mouse or a keyboard, an external storage device 107 for storing the image data to be merged and image data already merged, an communication interface (I/F) 108, connected to a communication line, for exchanging information with external terminals, and a bus 109, connected to the circuits, for transferring programs and data to the circuits.

The external storage device 107 is a storage medium, such as a hard disk drive or an optical disk drive, to which a random access is possible. The external storage device 107 stores the image A shown in FIG. 2A and the image B shown in FIG. 2B, for example. The image display device 105 provides a multi-window display, presenting a plurality images at the same time.

The processing circuit 101 is a central processing unit (CPU), and executes the processing program for the image data merging method, stored in the program memory 102. The program memory 102 is a semiconductor memory such as a ROM (Read Only Memory), a RAM (Random Access Memory), or a flash memory. The data memory 103 is a semiconductor memory such as a RAM or a flash memory.

The processing program is stored in the program memory 102 in this embodiment. Alternatively, the processing program can be stored in the external storage device 107, and transferred to the data memory 103 via the bus 109 so that the processing circuit 101 executes it. The processing program can be received through the communication line and the communication I/F 108 from an external terminal so that the processing circuit 101 executes it.

The processing program for the image data merging process can be provided from an information storage medium such as an magnetic disk or CD-ROM, or through a network such as the Internet or digital satellite service.

Figure 8:
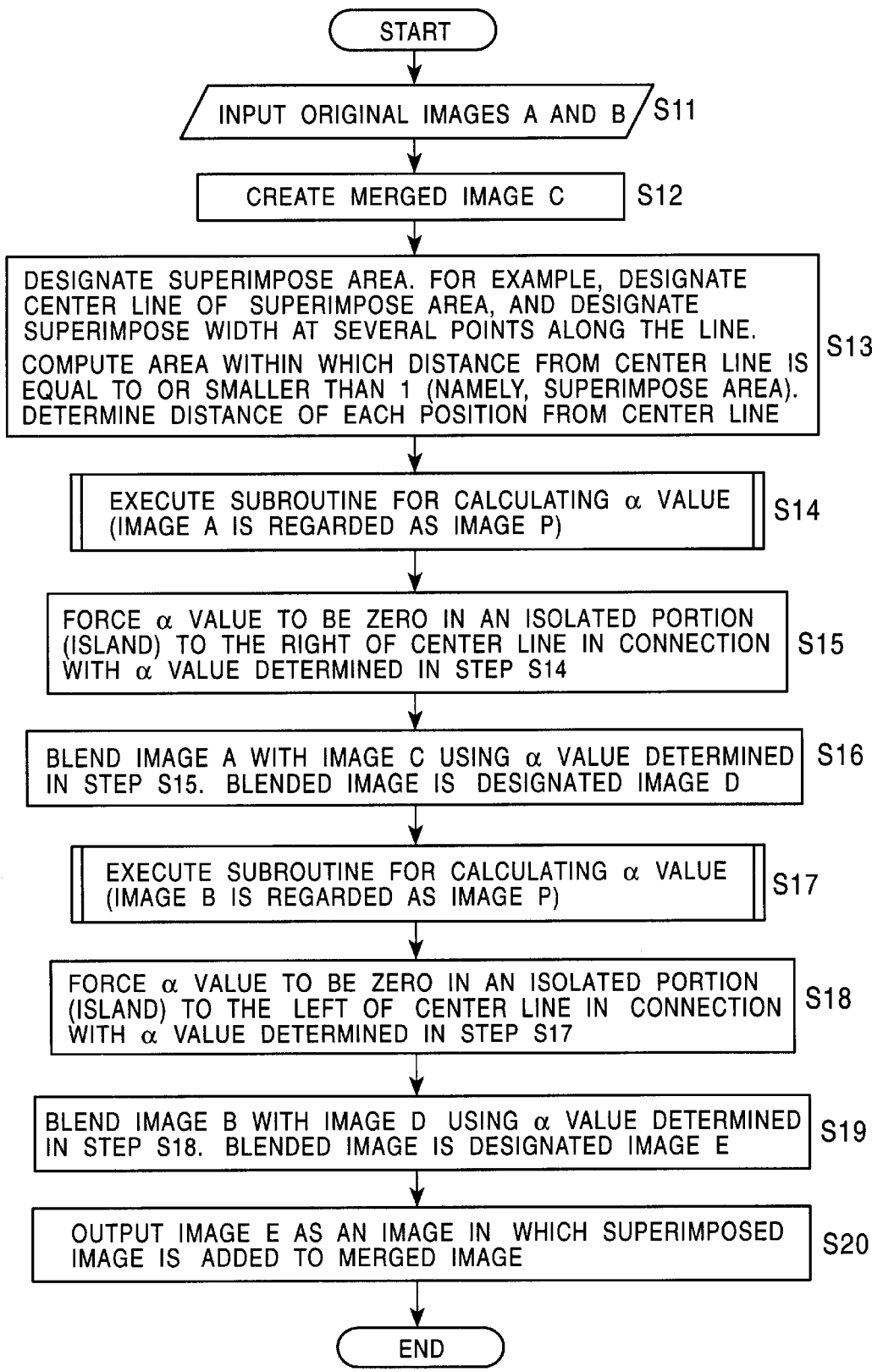
FIG. 8 is a flow diagram illustrating in detail the processing steps for the image data merging process.

FIG. 8 illustrates the processing program executed by the processing circuit 101, namely, the detailed procedure for the image data merging method.

Referring to FIG. 8, the operator designates the original image A and the original image B using the input device 106 in step S11. In the circuit arrangement shown in FIG. 7, the original image A and the original image B stored in the external storage device 107 are copied to the data memory 103 through the bus 109. The original image A and the original image B are displayed on the image display device 105 via the frame memory 104.

In step S12, the merged image C is formed using the multi-resolution techniques already described in connection with the conventional art. The computation for the creation of the merged image C is carried out by the processing circuit 101. The process goes to step S13.

The operator, who is going to operate the apparatus, designates a superimpose area using the input device 106. The processing circuit 101 sets up the superimpose area as hatched in FIG. 5A.

Figure 9A:
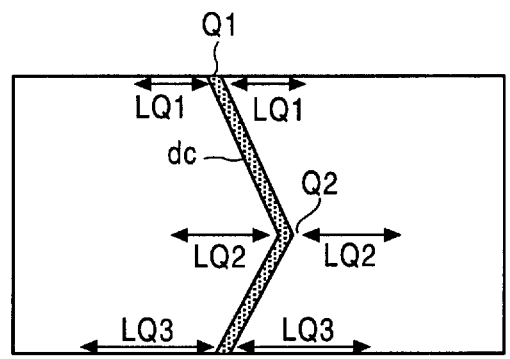
FIGS. 9A through 9C illustrate the process for setting a superimpose area in the image data merging method.
Figure 9B:
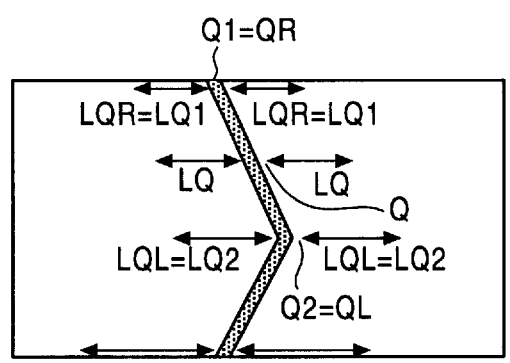
Figure 9C:
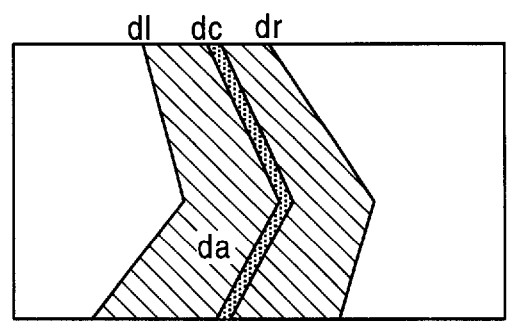

Referring to FIGS. 9A, 9B, and 9C, the setting of the superimpose area da is discussed in detail. As shown in FIG. 9A, the operator now designates the center line dc in the superimpose area within an area as large as the size of the original image, using the input device 106. As shown, the line dc is a broken line, but a curved line is also acceptable.

The operator designates a width $LQ_j$ of superimpose area for each of M points $Q_j$ (j=1, 2, ..., M) along the center line dc, using the input device 106. FIG. 9A shows the case of M=3.

The processing circuit 101 calculates the superimpose width LQ at each point shown in FIG. 9A, based on the value $LQ_j$. Specifically, the processing circuit 101 performs the following calculation for all points Q along the center line dc. Now, a point Q moves along the center line dc in one direction as shown in FIG. 9B. A first $Q_j$ (j=1, 2, ..., M) the moving point Q encounters is designated QR. The point Q then moves along the line dc in the reverse direction. A first $Q_j$ (j=1, 2, ..., M) the moving point Q encounters is designated QL. Let LQR represent the width of the superimpose area at QR, and LQL represent the width of the superimpose area at QL. The width LQ of the superimpose area at Q is LQ=(QQR×LQL+QQL×LQR)/(QQR+QQL).

Here, QQR and QQL, respectively, represent the length between Q and QR along the center line dc and the length between Q and QL along the center line dc. The value LQ is a weighted average in accordance with the distances from QL and QR. Referring to FIG. 9B, QR=Q1, QL=Q2, LQR=LQ1, and LQL=LQ2.

The distance from the center line dc is defined as follows.

Let $d(x_p,y_p)$ represent the distance between point $p(x_p, y_p)$ and the curved line dc, and $d(x_p,y_p)$ meets the following conditions.

P ∪{a circle, having a radius of d×LQ, centered on Q and the internal area of the circle} where Q ∈ curved line dc, and P ¬ ∪{a circle, having a radius of (d−δ)×LQ, centered on Q and the internal area of the circle} for any δ>0 where Q ∈ a loop C.

The symbol ¬ represents a complementary set. The equation d(xp,yp)=0 means that point P is on the curved line dc.

The areas, the distance of which to the curved line dc is equal to or smaller than 1, are summed. This is the superimpose area. Specifically, the hatched area da, shown in FIG. 9C, is the superimpose area. The left edge of the superimpose area (dl as shown) and the right edge of the superimpose area (dr as shown) indicate the distance of 1 to dc. The calculation of the superimpose area is performed by the processing circuit 101.

The distance d(x,y), to be used later, of each point (x,y) to the center line dc is now calculated by the processing circuit 101.

Step S13 in FIG. 8 has been discussed. Subsequent to step S13, step S14 is entered.

In step S14, the superimpose area of the original image A is determined. As already discussed, the original image A is blended with the merged image C with the weighted average. The degree of blend, namely, an α value indicative of the weight, is determined. An α value calculation subroutine is executed. An image P input in the subroutine is the original image A.

Figure 10:
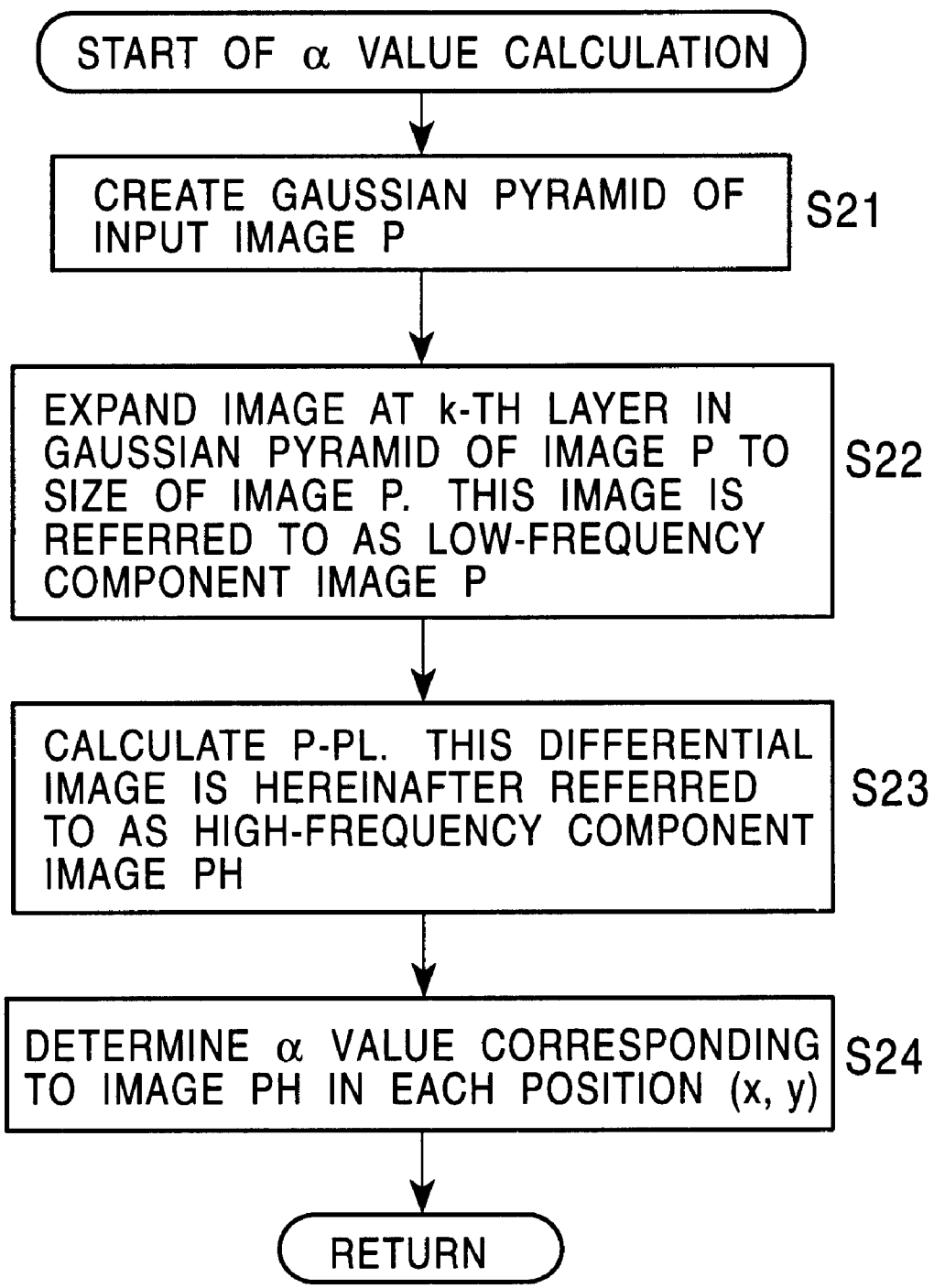
FIG. 10 is a flow diagram illustrating a series of processing steps for determining weight a in the image data merging method.

Referring to FIG. 10 through FIG. 14, the α value calculation subroutine is discussed in detail. FIG. 10 is a flow diagram showing the subroutine of the α value calculation. In step S21 in FIG. 10, the processing circuit 101 creates the Gaussian pyramid of the image P.

Figure 11:
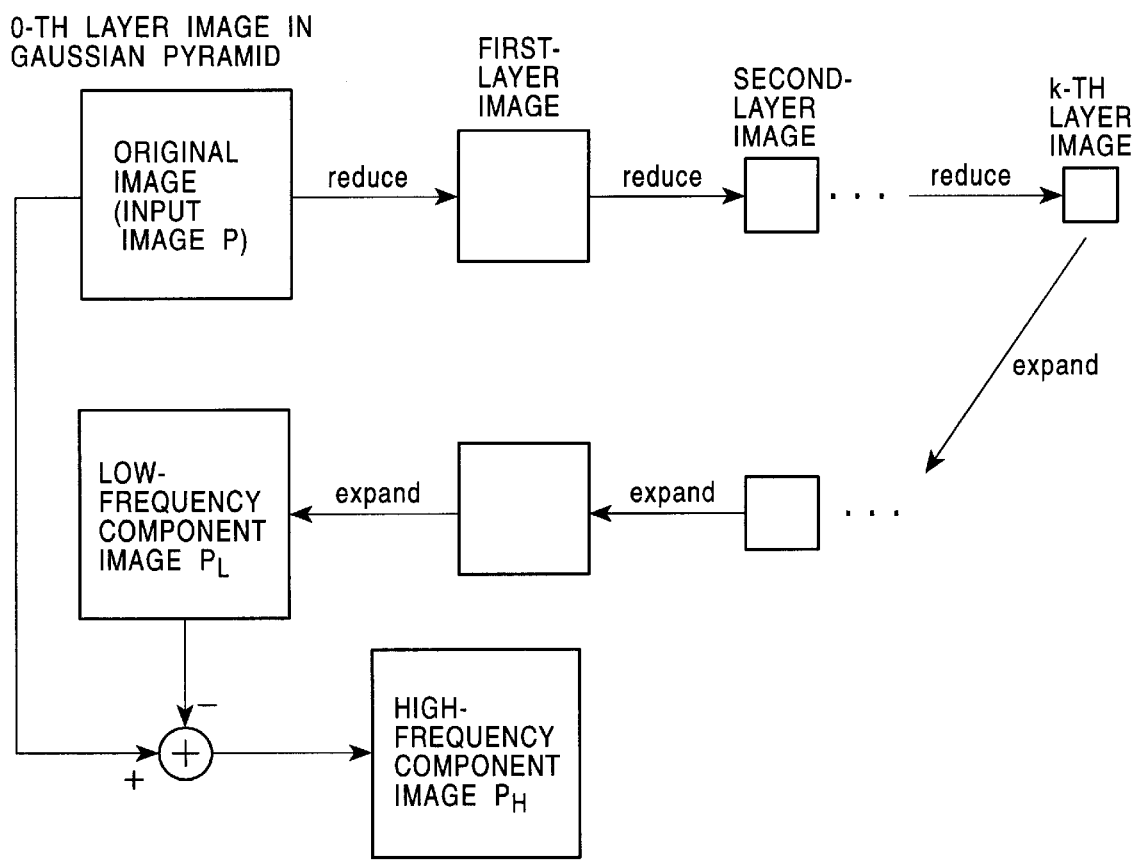
FIG. 11 illustrates a low-frequency component image and a high-frequency component image.

Referring to FIG. 11, the Gaussian pyramid is a set of images that are obtained by lower-pass filtering an original image (input image P) using the reduce operation. When the reduce operation is performed on the original image once, the image data of a first layer of the Gaussian pyramid is created. When the reduce operation is performed again, the image data of a second layer of the Gaussian pyramid is created. The reduce operation is iterated thereafter to create the higher layers of the Gaussian pyramid. The original image is referred to as the zero-layer image data. The higher the layer of the Gaussian pyramid, the lower the frequency of the image.

In step S22, the expand operation is repeated by k times on the image data of the image P at a k-th layer of the Gaussian pyramid to enlarge it to the size of the image P as shown in FIG. 11. As already described in connection with the conventional art, the image P is constructed of the low-frequency component with the high-frequency component removed. This image is designated PL. The value of k is input by the operator through the input device 106, and a series of calculations is performed by the processing circuit 101.

In step S23, the low-frequency component image PL is subtracted from the image P. Strictly speaking, as for each position (x,y), the value PL(x,y) of the image PL is subtracted from the value p(x,y) of the image P at that position. This calculation is performed by the processing circuit 101. The result of the calculation is designated PH, which is constructed of the high-frequency component of the image P.

In step S24, the value PH(x,y) of the image PH at each position (x,y) in the superimpose area is used to determine the α value.

The correspondence between each position (x,y) in the superimpose area and the α value is now discussed. Now, the selection of the superimpose area of the original image A is performed. As already discussed with reference to FIG. 6B, as it is farther from dl, the selection conditions are set to be more severe in the hatched, superimpose area da shown in FIG. 9C. Specifically, at each point (x,y) in the superimpose area, the distance from dl is {1−d(x,y)}, when the point is positioned to the left of the center line dc. The distance from dl is {1+d(x,y)}, when the point is positioned to the right of dl. The threshold is increased as the distance from dl increases. Here, d(x,y) represents the distance from the center line dc. When the threshold is exceeded, the point is treated as the superimpose area, and the α value is set to be 1. In other words, the α value, which is the position function (x,y) in the superimpose area, is expressed using the distance from dl and a function f dependent on the magnitude of PH(x,y), namely, α(x,y)=f(ddl(x,y),PHabs(x,y)). Here, ddl (x,y) is the distance between (x,y) and dl. PHabs(x,y) is the absolute value of PH(x,y). f(ddl,PHabs) is the function of ddl only, when PHabs is constant, and is a monotone decreasing function. d(ddl,PHabs) is the function of PHabs only, when ddl is constant, and is a monotone increasing function.

Figure 12:
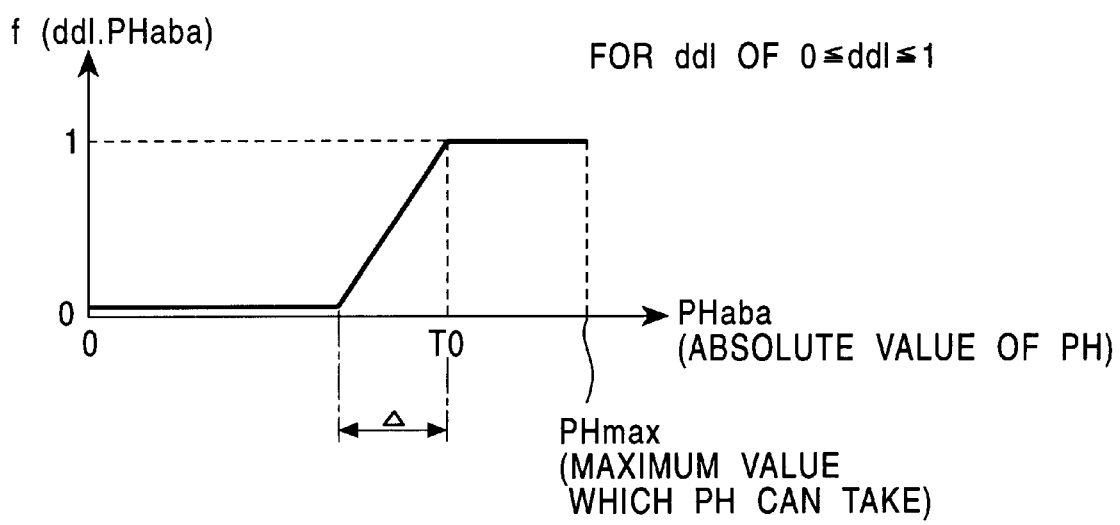
FIG. 12 illustrates a first specific example of weight function.
Figure 13:
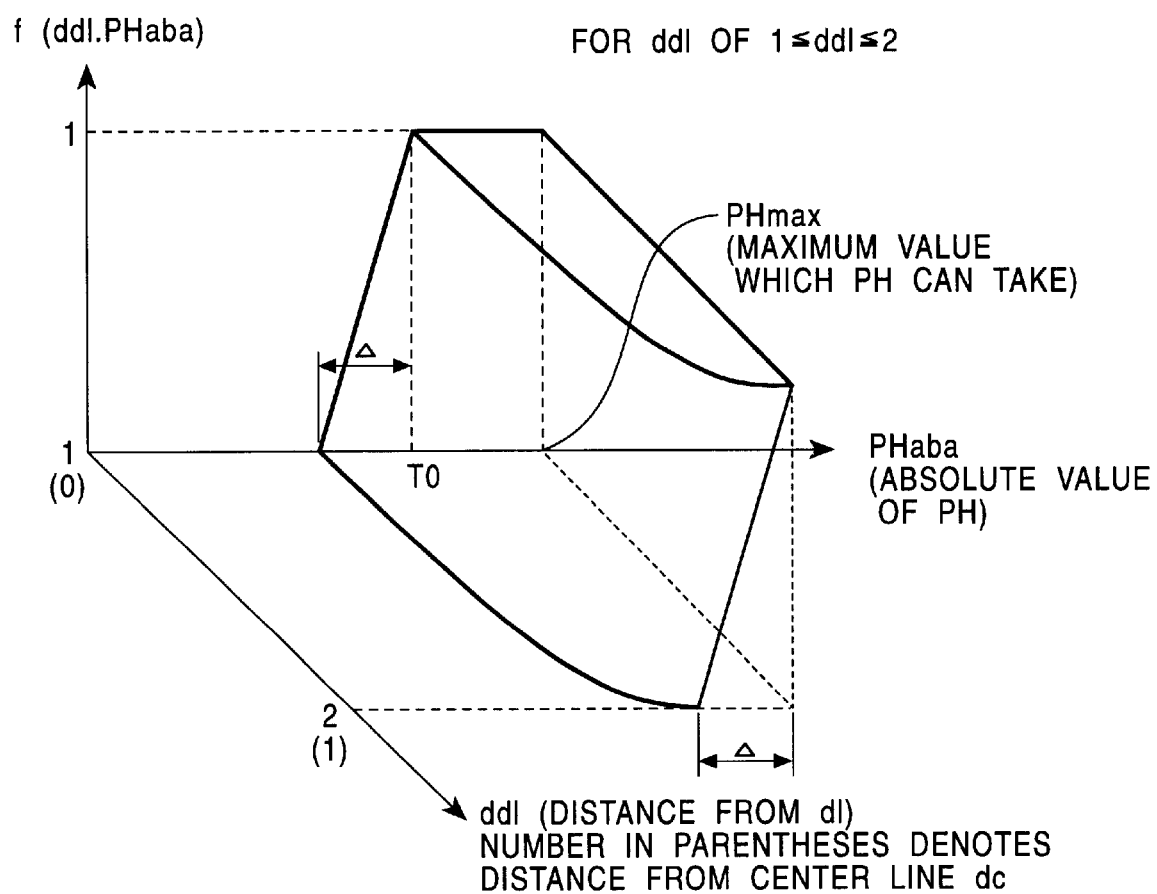
FIG. 13 illustrates a second specific example of weight function.
Figure 14:
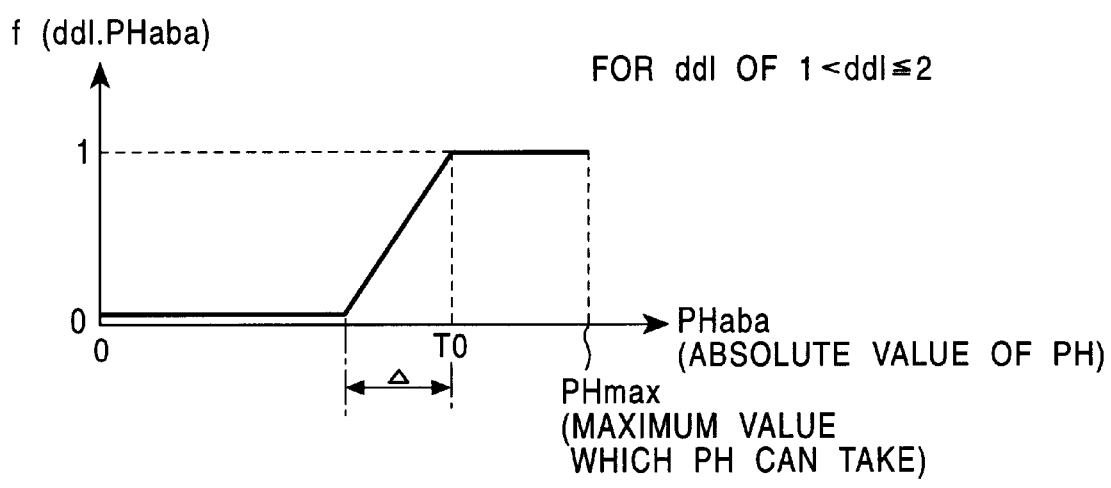
FIG. 14 illustrates a third specific example of weight function.

The specific examples of the function f are shown in FIG. 12 through FIG. 14. FIG. 12 shows the function f within a range of 0≦ddl≦1. Within this range, the function f is not dependent on ddl.

When the absolute value of PH is equal to or greater than T0, the function f=1, and when the absolute value of PH is equal to or smaller than {T0−Δ}, the function f=0. When the absolute value of PH falls within a range from {T0−Δ} to T0, the function f is linear.

FIG. 13 shows the function f within a range of 1≦dll≦2. The function f is dependent on ddl within this range. FIG. 14 is a sectional view taken along a section with ddl being constant in FIG. 13. When the absolute value of PH is equal to or greater than [PHmax−{(2−ddl)²}×(PHmax−T0)], the function f=1. When the absolute value of PH is equal to or smaller than [PHmax−((2−ddl)²)×(PHmax−T0)−Δ], the function f=0.

The function f is linear when the absolute value of PH is between [PHmax−{(2−ddl)²}×(PHmax−T0)−Δ] and [PHmax−{(2−ddl)²}×(PHmax−T0)]. PHmax is the maximum value PH can take. The function f shown in FIG. 13 applies within the range of 0≦ddl≦1, which is an area to the left of dc. The function f shown in FIG. 14 applies within the range of 1≦ddl≦2, which is an area to the right of dc.

FIG. 12 through FIG. 14 is one example of the function f. A function other than this is acceptable if the function is monotone decreasing with respect to ddl, and monotone increasing with respect to PHabs.

T0 and Δ are the values the operator inputs using the input device 106. In step S24 in FIG. 10, in response to the input T0 and Δ, the processing circuit 101 calculates the function f shown in FIG. 12 through FIG. 14 for each position (x,y) in the superimpose area and treats it as the α value.

The processing circuit 101 performs the processing step in step S24 to determine the α value at each position, ending the subroutine.

It is important that the image data used to determine the α value is based on the image PH constructed of the high-frequency component of the input image P. Since the outstanding element contains a great deal of high-frequency components, the α value is determined by analyzing the high-frequency components. The selection conditions are set to be more severe as it approaches the right edge of the superimpose area, farther from dl, nearer to dr, and as it approaches the right edge of the superimpose area, the selected portions become less. The α value takes not only 0 and 1, but also a range of 0<α<1 in response to the range of Δ.

The weight calculation step, namely, the α value calculation subroutine in step S14 in FIG. 8, has been discussed. The process then goes to step S15.

In step S15 in FIG. 8, the portion of the α value (island) present only to the right of the center line dc is forced to be zero. The reason for this has already been discussed in connection with the creation of the image in FIG. 5C from the image shown FIG. 5B. Now, the outstanding elements, from the original image A, to be superimposed on the merged image C are now selected. This superimposing step is required to prevent the outstanding elements to the left of the center line dc from abruptly disappearing at the center line dc. In other words, only the outstanding elements with their portions partly present to the left of the center line dc, need to be processed. Superimposing the outstanding element independently present to the right of the center line dc is therefore not necessary. To delete the elements present to the right of the center line dc, the α value is forced to be zero.

The processing circuit 101 performs the process in step S15. With respect to a position (x,y) having non-zero α value, four α values to the left and right of (x,y), and upward and downward of (x,y), are examined. If the α value is not zero, its position is connected to (x,y). If the α value is zero, its position is not connected to (x,y). The "island" is thus created by connecting the positions having non-zero α values. Any two points within an single island join with each other via points having non-zero α values. Any two points respectively belonging to two different islands do not join with each other unless they extend over a point having zero α value. When the island is created, each island is checked to see whether at least one point constituting the island is positioned to the left of the center line dc. If at least one point is positioned to the left of the center line dc, no further operation about that island is performed. If no point is positioned to the left of the center line dc, in other words, if all points constituting the island are positioned to the right of the center line dc, the α values of all points constituting the island are forced to be zero. The process in step S15 now ends, and goes to step S16.

In step S16, the original image A is superimposed on the merged image C. Specifically, the processing circuit 101 determines an image D using the α value determined in steps S14 and S15, for each position (x,y) in the superimpose area, in accordance with the following equation.

$$D(x,y)=\alpha(x,y)\times A(x,y)+\{1-\alpha(x,y)\}\times C(x,y)$$

In a position having the α value=1, the original image A fully overwrites.

Step S16 completes the superimpose operation of the original image A. The process then goes to step S17 to superimpose the original image B.

In step S17, the α value calculation subroutine is carried out in the same manner as in step S14. The portion of the original image B to be superimposed is determined in step S17. In practice, the original image B is blended with the image D using weighted coefficients. The degree of blend, namely, the α value indicative of the weight, is determined. An image P input in the subroutine is the original image B.

In the subroutine, the image PH is determined from the high-frequency component of the image P, namely, the original image B. Using the value PH(x,y) of the image PH at each position (x,y) in the superimpose area, the α value at the position (x,y) is determined. Although the selection of the superimpose area of the original image A is carried out in step S14, the selection of the superimpose area of the original image B is now. carried out. Using a function f dependent on the distance from dr and the magnitude of PH(x,y), α(x,y)=f(ddr(x,y),PHabs(x,y)) is determined.

Here, ddr(x,y) is the distance between (x,y) and dr, and is {1−d(x,y)}, when point (x,y) is positioned to the right of the center line dc. The distance ddr(x,y) is {1+d(x,y)}, when the point (x,y) is positioned to the left of the center line dc. PHabs(x,y) is the absolute value of PH(x,y). Here, f(ddr, PHabs) is the function of ddr only, when PHabs is constant, and f(ddr,PHabs) is a monotone decreasing function. The element f(ddr,PHabs) is the function of PHabs only when ddr is constant, and f(ddr,PHabs) is a monotone increasing function. Subsequent to step S17, the process goes to step S18.

In step S18, the α value of a portion (island) independently present to the left of the center line dc is forced to be zero. This operation is identical to that already discussed in connection with that in step S15, and is not discussed again here. The process goes to step S19.

In step S19, the original image B is superimposed onto the image D, which is the merged image C having the original image A superimposed thereon. Specifically, for each position (x,y) in the superimpose area, the processing circuit 101 determines an image E using the a value determined in step S17 and step S18, in accordance with the following equation.

$$E(x,y)=\alpha(x,y)\times B(x,y)+\{1-\alpha(x,y)\}\times D(x,y)$$

At a position (x,y) having the α value=1, the original image B fully overwrites.

Step S19 completes the superimpose operation of the original image B.

In step S20, the image E, as the merged image on which the images are superimposed, is output to the image display device 105 via the frame memory 104 to be presented there. Step S20 completes this series of processing steps.

In the flow diagram of the embodiment of the present invention shown in FIG. 8, the original image A is superimposed onto the merged image C, and then, the original image B is further superimposed onto the merged image C. This is because the hair stretching along from right to left is considered here. The direction of the hair from its root to its tip is from right to left. When outstanding hairs are superimposed, the outstanding hairs on the right must come on top of the outstanding hairs on the left. In other words, the outstanding hairs on the right can overwrite and erase the outstanding hairs on the left, but the outstanding hairs on the left cannot overwrite the outstanding hairs on the right. For this reason, the right image B is superimposed last.

Figure 15:
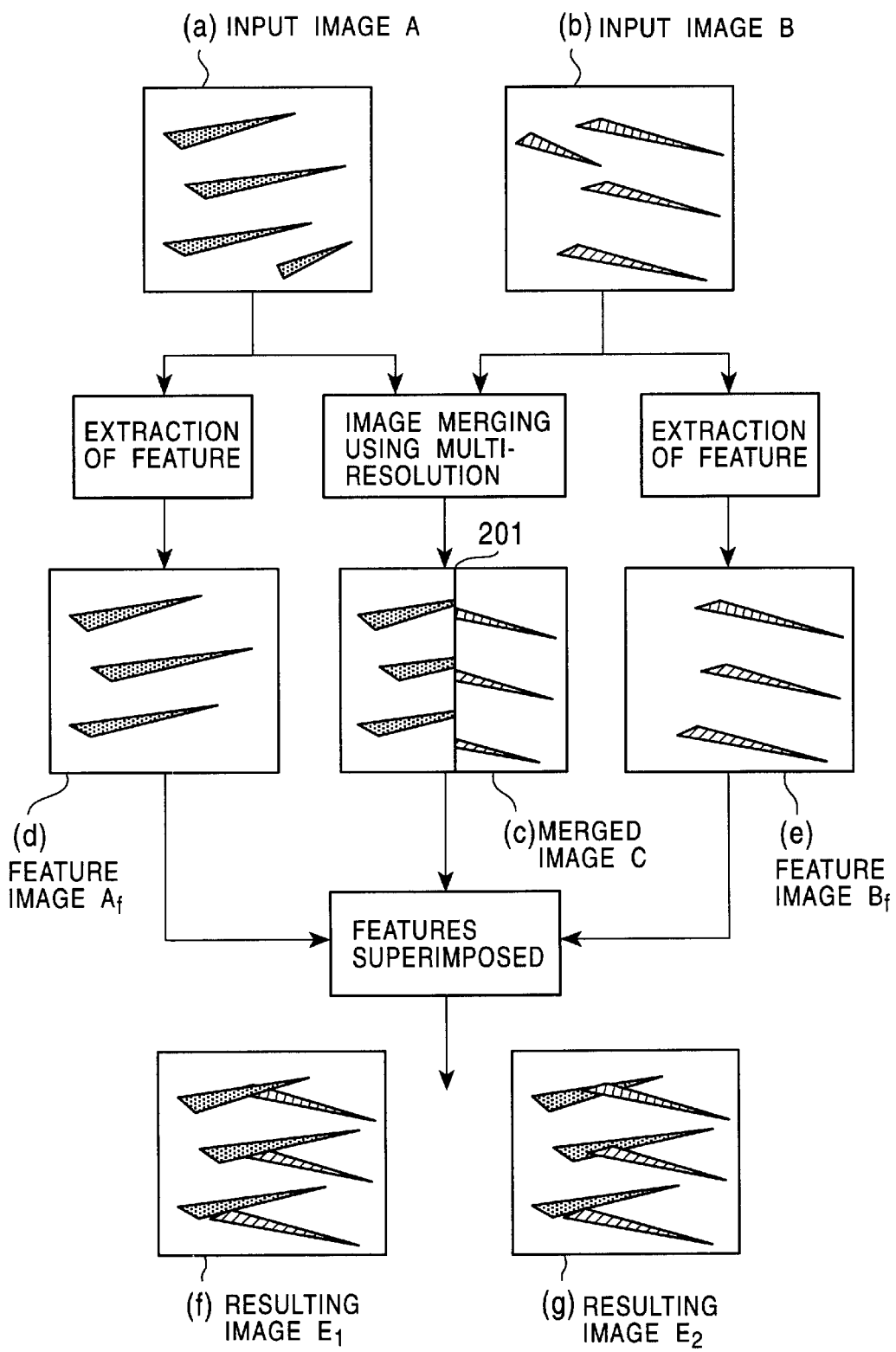
FIG. 15 specifically illustrates the process for the image data merging method, in which the line of merge is a straight line.
Figure 16:
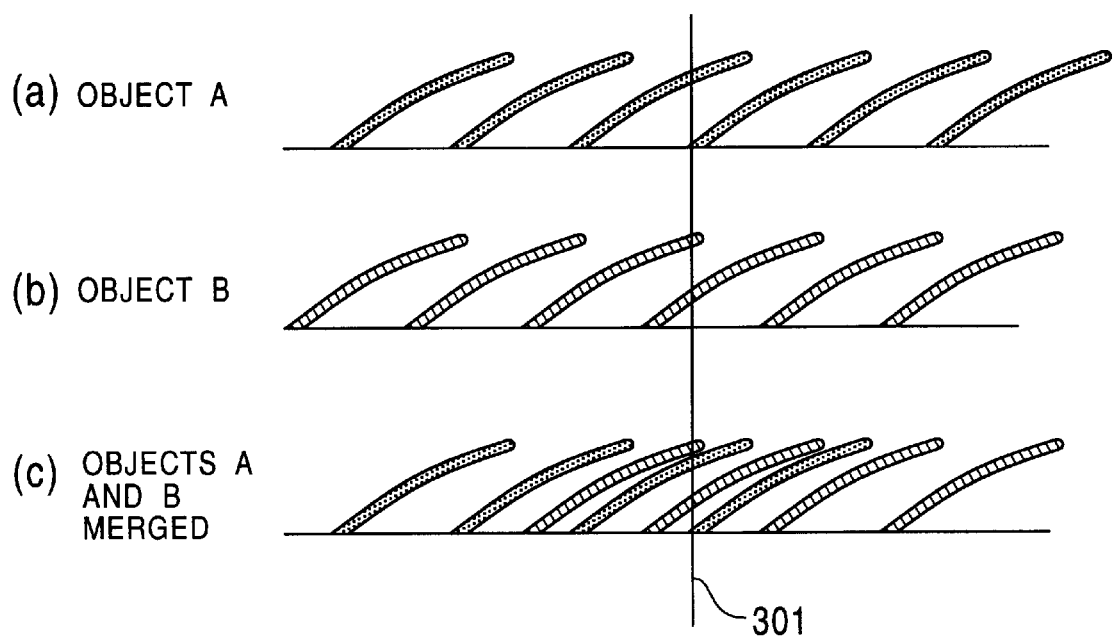
FIG. 16 shows two objects in which the two objects are three-dimensionally merged.
Figure 17:
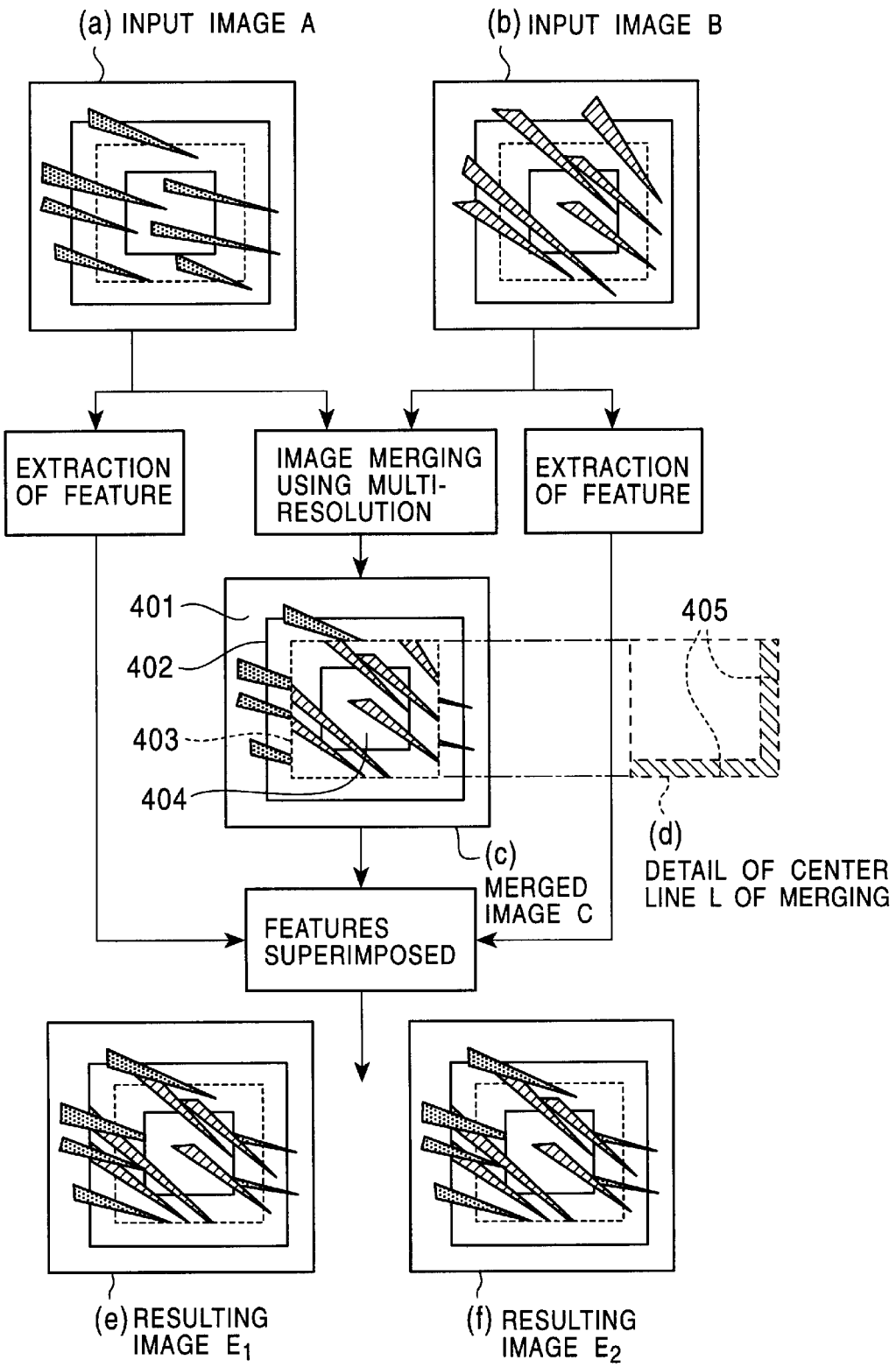
FIG. 17 specifically illustrates the process for the image data merging method, in which the line of merge is a polygon.

Referring to FIG. 15, the hairs are now stretched along from left to right. The image A in FIG. 15(a) and image B in FIG. 15(b) are input and merged with respect to the center line in each image using the multi-resolution techniques. In the merged image C, a center line 201, not really present on screen, is the center of merge as shown in FIG. 15(c). If the superimpose area of outstanding elements extends over the entire image, the center of the superimpose area coincides with the center of merge. As shown, dark and gray elongated wedge-shaped objects are outstanding elements (hairs) in the images. The blank portion indicates less distinct elements, which are not shown in FIG. 15 because they are not important in the context of the present invention. In the outstanding elements, namely, the hairs, the heavy ends on the left are the roots of the hairs, and the sharp ends on the right are the tips of the hairs. In the merged image C, the outstanding elements in the image A and the image B abruptly disappear at the center of merging.

The outstanding elements crossing the center line of the superimpose area are extracted from each of the image A and the image B to create a feature image Af shown in FIG. 15(d) and a feature image Bf shown in FIG. 15(e).

The feature image Af and the feature image Bf are superimposed on the merged image C. This superimpose operation is carried out so that the tip of one outstanding element comes on top of the root of another outstanding element. The following discussion is given with reference to the case in which three-dimensional objects are ideally merged. Referring to FIG. 16(a) and FIG. 16(b), two objects A and B of two different types of hair are three-dimensionally merged, and the hairs crossing the center line 301 of merge need to be extended from their roots. If viewed from above, as shown in FIG. 16(c), the root of the hair is below the tip of the hair, and is in a hidden state. If the tip of one element covers and hides the root of another element, the root of the outstanding element is also hidden in the superimposed result.

When the hair is stretched along from right to left, the image D is created by superimposing the feature image Af having a feature extracted from the image A on the merged image C, and the image E is created by superimposing the feature image Bf onto the image D, as described with reference to FIG. 8. When the hair is stretched from left to right as shown in FIG. 15, the feature image Bf shown in FIG. 15(e) is superimposed on the merged image C, and the feature image Af shown in FIG. 15(d) is further superimposed. An image E1 shown in FIG. 15(f) thus results. In the resulting image E1, the root side of the hair in the feature image Bf is hidden by the hair of the feature image Af. The hair added through the superimpose operation is smoothly blended with other hair. If the feature image Af is first superimposed on the merged image C and the feature image Bf is then superimposed in the superimpose operation, the image E2 shown in FIG. 15(g) results. In the resulting image E2, the root side of the hair in the feature image Bf is drawn on top of the hair in the feature image Af. The resulting image E2 thus looks unnatural because the root of the hair, which is normally not exposed, suddenly appears.

A natural looking image is thus provided by superimposing outstanding elements in the direction of flow of the outstanding elements, with consideration given to the direction of the outstanding elements.

In the above discussion, the center line in the superimpose area is not a loop, and the superimpose area has a bandlike shape. Discussed here is the case in which the center line of the superimpose area is polygonal. The idea of the polygonal center line of the superimpose area can be applied to a looped center line of the superimpose area.

An image A shown in FIG. 17(a) and an image B shown in FIG. 17(b) are input and merged using the multi-resolution techniques to create a merged image C as shown in FIG. 17(c). In the merged image C, a square represented in dotted line 403 serves as the center of merge, and a frame area 402 serves as an area in which the image A and the image B are blended. Since the area 402 also serves as the superimpose area in this case, the square of dotted line 403 serves as the center of merge and a center line L of the superimpose area. An area 401 provides the image A, and an area 404 provides the image B. The dotted line and full lines in the figure are for the purposes of illustration only, and are not really presented.

When the center line L of the superimpose area is polygonal, the order of superimposing of outstanding elements in the superimpose operation is designated according to the side of the center line L of the superimpose area, on a per side basis.

If the order of superimposing is not designated according to the side of the center line L of the superimpose area, on a per side basis, the image E2 shown in FIG. 17(f) results when the feature image Af is simply superimposed after the feature image Bf is superimposed. In the resulting image E2, the root of the hair of the feature image Bf is hidden by the hair of the feature image Af in a natural superimposed appearance on the left side of the square of the superimpose area. On the right side of the square, the root of the hair of the feature image Af stands out, resulting an unnatural appearance.

When the order of superimposing is not designated according to the side of the center line L of the superimpose area, the natural superimposing is performed on one portion while the unnatural superimposing is performed on the other portion.

Referring to FIG. 17(d), sides LA405 where the feature image A is superimposed first are designated, and on the remaining sides, the feature image B is first superimposed. A resulting image E1 is shown in FIG. 17(e). In the resulting image E1, a natural-looking superimposing is achieved with the root of one hair hidden by another hair.

The natural-looking superimposed image is thus obtained by designating the superimposing order according to the side of the center line of the superimpose area, with consideration give to the direction of the outstanding elements.

Figure 18:
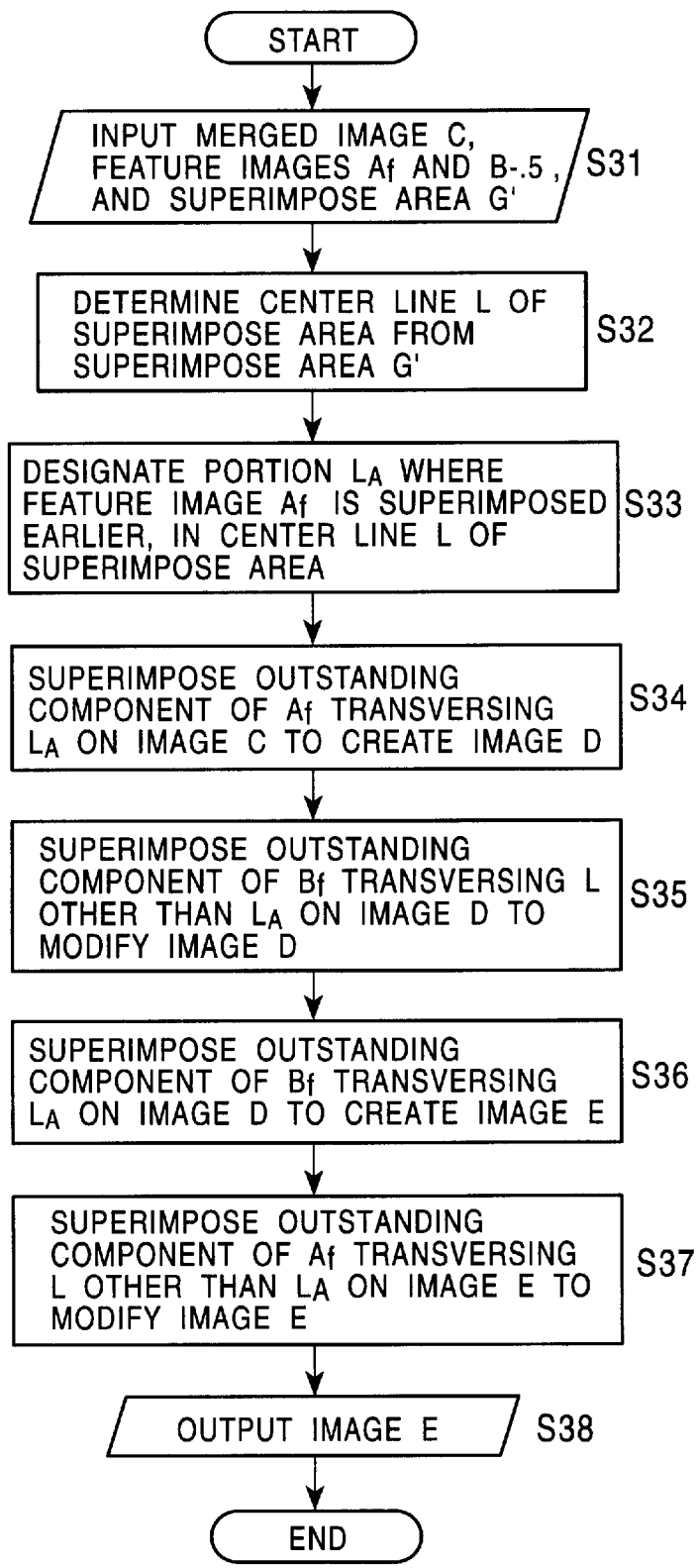
FIG. 18 is a flow diagram illustrating a series of processing steps for a superimpose operation.

FIG. 18 illustrates a series of processing steps of a generalized superimposing process. In step S31, the merged image C resulting from the superimposing of the image A and the image B through the multi-resolution techniques, the feature images Af and Bf respectively hextracted from the image A and the image B, and a superimpose area G' are input. Although the superimpose area G' and the mask image G used in the merging are normally identical to each other, the superimpose area G', different from the mask image G, can be input. If the superimpose area G' is not input, the mask image G is used as the superimpose area G'.

In step S32, the center line L is determined from the superimpose area G'. When the superimpose area G' is identical to the mask image G, and when the merge area is designated by the center line of merge and the width from the center line, the processing step in step S32 is skipped, and the designated center line of merge is also used as the center line L of superimpose.

In step S33, a portion LA of the center line L of the superimpose area, where the feature image Af is superimposed earlier than the feature image Bf, is designated by the operator.

The center line L of the superimpose area and the order of superimposing are set in this way. A first superimposing process in steps S34 and S35 is carried out. In step S34, the feature image Af crossing LA designated in step S33 is superimposed onto the merged image C to create the image D. In step S35, the feature image Bf crossing the center line L other than LA is superimposed on the image D to modify the image D.

A second superimposing process in steps S36 and S37 is performed on the image D thus obtained. The feature image Bf crossing LA is superimposed on the image D to create the image E in step S36. In step S37, the feature image Af crossing the center line L other than LA is superimposed on the image E to modify the image E. The image E thus obtained becomes an output image. Step S38 outputs the image E, completing this series of processing steps.

The superimposing process thus results in a natural-looking image with the direction of the outstanding elements taken into consideration.

In the above discussion, the center line L of the superimpose area forms a polygon, and the order of superimposing is designated by the side. The area designated is not limited to the sides of the polygon. Any appropriate portion of the center line L of the superimpose area can be designated. The center line L of the superimpose area does not necessarily form a polygon. A loop having any configuration can be used. For example, the center line L is a loop having any configuration, and several control points are set up along the center line L of the superimpose area. In the curved line having a start point and an end point at these control points, any portion LA where the feature image Af is first superimposed can be designated.

In creating an "island" having a non-zero α value, a point of interest is determined and four points to the right and the left of and upward and downward of the point of interest, are examined. The point of interest is connected to the each point if it has non-zero α value. A total of eight points, namely, these four points plus four points positioned slantly upward and downward of the point of interest, can be used as adjacent points. If the eight points have non-zero α values, they are connected to the point of interest to create an island.

In the above discussion, the Gaussian pyramid is employed to pick up the high-frequency component of the original image. Alternatively, the high-frequency component can be extracted by high-pass filtering the original image. If the multi-resolution techniques are used to create a merged image, the Gaussian pyramid is already created in the course of creating the merged image of the original image. To pick up the high-frequency component of the original image using the Gaussian pyramid, a re-calculation of the Gaussian pyramid is not required. The Gaussian pyramid, already created in the course of the creation of the merged image, can be used.

The above-referenced image data merging method can be applied to merge two images with the size of the merge area limited to form a merged image having a smooth splice. The data merging method that limits the merge area in the splice of the two images was not conventionally available. The image data merging method is discussed.

The conventional method using the multi-resolution techniques suffers from a problem when two images are spliced with the size of the merge area limited.

Figure 19A:
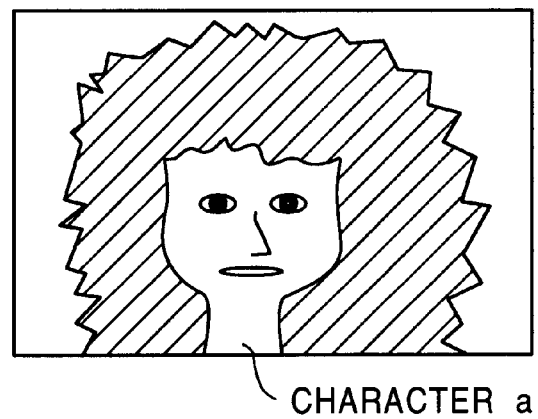
FIGS. 19A through 19C illustrate a specific example for splicing two images with a merge area limited.
Figure 19B:
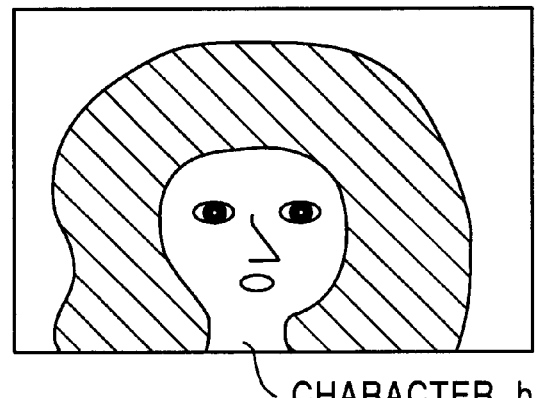
Figure 19C:
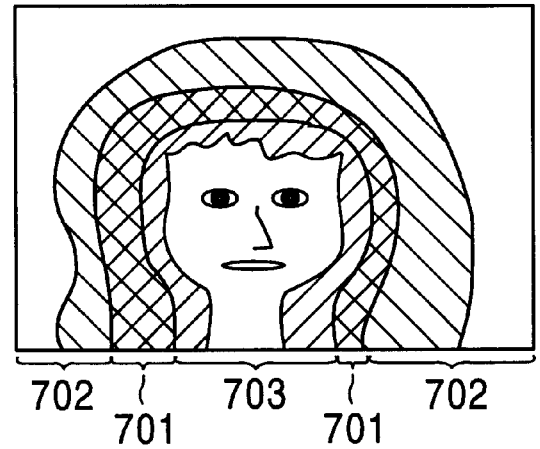

For example, a photograph (image B) of the face of a character b shown in FIG. 19B is now replaced with a photograph (image A) of the face of a character a shown in FIG. 19A. The image of the face of the character b and the portion of the hair close to the face are replaced with the image of the face of the character a and the portion of the hair close to the face. An area 702 is the image B, and an area 703 is the image A. The superimpose area between the image A and the image B is preferably the portion of the hair, namely, within the area 701, as shown.

The use of the multi-resolution techniques spreads the merge area between the image A and the image B over the entire image as the frequency components get lower. The area 703 where the face of the character a is directly used is influenced by the effect of the image B. The external area 702 of the character b is influenced by the effect of the image A.

In the image data merging method, a first frequency data group including frequency components is obtained by frequency-dividing first data in a first frequency division step, and a second frequency data group including frequency components is obtained by frequency-dividing second data in a second frequency division step.

In a merge area calculation step, a merge area having a predetermined merge width is calculated. In a weight function calculation step, a weight function is calculated which is dependent on frequency layers to which the first frequency data group and the second frequency data group respectively belong, and dependent on their position in each frequency layer. In a synthesizing step, a third frequency data group is generated by weighted-summing the first frequency data group and the second frequency data group with a weight which is expressed by a weight function in each frequency component.

In a summing step, the third frequency data group generated in the synthesizing step is summed to generate third data. In an output step, the third data obtained in the summing step is output as data into which the first data and the second data are merged.

In accordance with the image data merging method, the size of the merge area is changed depending on position. The size of the merge area is designated by the user. Even if the merge area widens as the frequency component gets lower, the conventional problem that the result of weighted average of the low-frequency component (direct current component in its extreme case) affects the entire image is eliminated.

In accordance with the image data merging method, a maximum merge area is designated, and image blending is performed using the weighted average. No blending is carried out outside the merge area.

When the superimposing method of the present invention is used to superimpose the image on the merged image obtained through the image data merging method, the maximum merge area can be set identical to the superimpose area. The following advantages are provided if the two areas are set to be identical.

If the merged area is created through the image data merging method, the center line of the merge area is already designated, and the distance from each. point to the center line is already calculated. The maximum merge area, set to be identical to the superimpose area, means that the center line for designating the merge area is also used as a center line for designating the superimpose area. Since the center line is shared by both areas, a single designating of the center line by the operation is sufficient. Since the distance from the center line to each point within the superimpose area is equal to that from the center line to each point in the merge area, the distance value can be reused without the need for the re-calculation of the distance.

The feature of the image data merging method is that the data of the high-frequency component of each original image is compared with the threshold to determine a portion having a value greater than the threshold to be a position of an outstanding element. This is because an outstanding element contains a great deal of high-frequency components.

The image data merging method changes adaptively the threshold depending on the position within the superimpose area. With this arrangement, the outstanding elements are prevented from disappearing at the edge of the superimpose area.

In accordance with the image data merging method, the image, when superimposed, is blended with the weighted coefficient. With this arrangement, the border between the superimposed area and non-superimposed area becomes less distinct, and a more natural-looking image is obtained.

Referring to FIG. 7, the image data merging apparatus 100 stores, in the program memory 102, the processing program for the image data merging method. The program can be stored in an optical disk such as a CD-ROM. If the processing program is read from a medium for providing the processing program for the image data merging method to execute the program, the border between the superimposed area and the non-superimposed area becomes less distinct, and a more natural-looking image is obtained.

The image data merging apparatus 100 can store the output image in the external storage device 107, or can outwardly transmit it through the communication I/F 108.

As described above, in accordance with the data merging method of the present invention, the data of the high-frequency component of each original image is compared with the threshold, and the portion having a value equal to or greater than the threshold is determined to be the position of the outstanding element. With this arrangement, the designating of the outstanding element is automated. Since the threshold is varied depending on the position within the merge area, the superimposing for more natural-looking synthesis of the original images is performed.

In the data merging method of the present invention, the center line of merge is divided into partitions in accordance with the flow of the outstanding elements such as hairs, and the order of superimposing the outstanding elements is designated. The more natural-looking merging of the images is thus performed.

In the data merging method of the present invention, the program for the data merging method is read from the medium and is executed to merge the image data. A natural-looking merged image is thus provided.

What is claimed is:

1. A method for merging a plurality of data, comprising:
   an extracting step of extracting at least one of a high-frequency component of first data and a high-frequency component of second data;
   a setting step of defining a synthesis area which includes a portion of the first data and a portion of the second data; and
   a synthesizing step of determining a composite value of the first data and the second data in accordance with at least one of an amount of the high-frequency component of the first data and an amount of the high-frequency component of the second data, wherein the synthesizing step performs a synthesis process in the synthesis area.

2. A method for merging a plurality of data, according to claim 1, wherein the synthesizing step determines the composite value of the first data and the second data in a position where a high-frequency component is present, in accordance with at least one of the amount of the high-frequency component of the first data and the amount of the high-frequency component of the second data.

3. A method for merging a plurality of data, according to claim 1, further comprising a merging step of merging the first data and the second data to generate merged data, wherein the extracting step extracts the high-frequency component of the first data, and the synthesizing step synthesizes the merged data and the first data in accordance with the amount of the extracted high-frequency component of the first data, to generate composite data.

4. A method for merging a plurality of data, according to claim 1, further comprising a merging step of merging the first data and the second data to generate merged data, wherein the extracting step extracts the high-frequency component of the first data and the high-frequency component of the second data, and the synthesizing step generates a first composite data by synthesizing the merged data and the first data in accordance with the amount of the extracted high-frequency component of the first data, and generates composite data by synthesizing the first composite data and the second data in accordance with the amount of the extracted high-frequency component of the second data.

5. A method for merging a plurality of data, according to claim 1, further comprising a merging step of merging the first data and the second data to generate merged data, wherein the extracting step extracts the high-frequency component of the first data and the high-frequency component of the second data, and the synthesizing step generates a first composite image by synthesizing the merged data and one of the first data and the second data in accordance with the amount of the high-frequency component of the one of the first data and the second data, and synthesizes the first composite image and the other of the first data and the second data, not used in the synthesis of the first composite image, in accordance with the high-frequency component of the other of the first data and the second data, in order to generate composite data.

6. A method for merging a plurality of data, according to claim 5, wherein the synthesizing step synthesizes the first data, the second data and the merged data in the synthesis area.

7. A method for merging a plurality of data, according to claim 6, wherein the synthesizing step synthesizes the plurality of data in an order dependent on a position of each data within the synthesis area of the data.

8. A method for merging a plurality of data, according to claim 7, wherein the synthesizing step divides the synthesis area into a plurality of partitions, and synthesizes the data, in the synthesis order dependent on the position of each high-frequency component of data, on a per partition basis.

9. A method for merging a plurality of data, according to claim 1, wherein the extracting step extracts a high-frequency component in the synthesis area.

10. A method for merging a plurality of data, according to claim 1, further comprising the determining step of determining a weighted coefficient during the synthesis of the data, wherein the synthesizing step performs a synthesis process in accordance with the determined weighted coefficient.

11. A method for merging a plurality of data, according to claim 10, wherein the determining step determines the weighted coefficient in accordance with a position of the high-frequency component.

12. A method for merging a plurality of data, according to claim 10, wherein the determining step determines the weighted coefficient, based on a distance from an edge of the synthesis area.

13. A method for merging a plurality of data, according to claim 12, wherein the determining step determines the weighted coefficient, based on the distance from the edge of the synthesis area and the absolute value of the high-frequency component.

14. A method for merging a plurality of data, according to claim 13, wherein the determining step determines the weighted coefficient using a monotone increasing function, when the distance from the edge of the synthesis area is constant.

15. A method for merging a plurality of data, according to claim 13, wherein the determining step determines the weighted coefficient using a monotone decreasing function, when the absolute value of the high-frequency component is constant.

16. A method for merging a plurality of data, according to claim 10, wherein the determining step determines the weighted coefficient, based on the amount of the high-frequency component.

17. A method for merging a plurality of data, according to claim 16, wherein the determining step determines the weighted coefficient, based on the absolute value of the amount of the high-frequency component.

18. A method for merging a plurality of data, according to claim 10, wherein the determining step determines, to be zero, the weight in a portion where the high-frequency component is present on a particular side with respect to a predetermined position in the synthesis area.

19. An apparatus for merging a plurality of data, comprising:
   extracting means for extracting at least one of a high-frequency component of first data and a high-frequency component of second data;
   setting means for defining a synthesis area which includes a portion of the first data and a portion of the second data; and
   synthesizing means for determining a composite value of the first data and the second data in accordance with at least one of an amount of the high-frequency component of the first data and an amount of the high-frequency component of the second data, wherein the synthesizing means performs a synthesis process in the synthesis area.

20. An apparatus for merging a plurality of data, according to claim 19, wherein the synthesizing means determines the composite value of the first data and the second data in a position where a high-frequency component is present, in accordance with at least one of the amount of the high-frequency component of the first data and the amount of the high-frequency component of the second data.

21. An apparatus for merging a plurality of data, according to claim 19, further comprising merging means for merging the first data and the second data to generate merged data, wherein the extracting means extracts the high-frequency component of the first data, and the synthesizing means synthesizes the merged data and the first data in accordance with the amount of the extracted high-frequency component of the first data, to generate composite data.

22. An apparatus for merging a plurality of data, according to claim 19, further comprising merging means for merging the first data and the second data to generate merged data, wherein the extracting means extracts the high-frequency component of the first data and the high-frequency component of the second data, and the synthesizing means generates a first composite data by synthesizing the merged data and the first data in accordance with the amount of the extracted high-frequency component of the first data, and generates composite data by synthesizing the first composite data and the second data in accordance with the amount of the extracted high-frequency component of the second data.

23. An apparatus for merging a plurality of data, according to claim 19, further comprising merging means for merging the first data and the second data to generate merged data, wherein the extracting means extracts the high-frequency component of the first data and the high-frequency component of the second data, and the synthesizing means generates a first composite image by synthesizing the merged data and one of the first data and the second data in accordance with the amount of the high-frequency component of the one of the first data and the second data, and synthesizes the first composite image and the other of the first data and the second data, not used in the synthesis of the first composite image, in accordance with the high-frequency component of the other of the first data and the second data, in order to generate composite data.

24. An apparatus for merging a plurality of data, according to claim 23, wherein the synthesizing means synthesizes the first data, the second data and the merged data in the synthesis area.

25. An apparatus for merging a plurality of data, according to claim 24, wherein the synthesizing means synthesizes the plurality of data in an order dependent on a position of each data within the synthesis area of the data.

26. An apparatus for merging a plurality of data, according to claim 25, wherein the synthesizing means divides the synthesis area into a plurality of partitions, and synthesizes the data, in the synthesis order in the position of each high-frequency component of data, on a per partition basis.

27. An apparatus for merging a plurality of data, according to claim 19, wherein the extracting means extracts a high-frequency component in the synthesis area.

28. An apparatus for merging a plurality of data, according to claim 19, further comprising determining means for determining a weighted coefficient during the synthesis of the data, wherein the synthesizing means performs a synthesis process in accordance with the determined weighted coefficient.

29. An apparatus for merging a plurality of data, according to claim 28, wherein the determining means determines the weighted coefficient in accordance with a position of the high-frequency component.

30. An apparatus for merging a plurality of data, according to claim 28, wherein the determining means determines the weighted coefficient, based on a distance from an edge of the synthesis area.

31. An apparatus for merging a plurality of data, according to claim 30, wherein the determining means determines the weighted coefficient, based on the distance from the edge of the synthesis area and the absolute value of the high-frequency component.

32. An apparatus for merging a plurality of data, according to claim 31, wherein the determining means determines the weighted coefficient using a monotone increasing function, when the distance from the edge of the synthesis area is constant.

33. An apparatus for merging a plurality of data, according to claim 31, wherein the determining means determines the weighted coefficient using a monotone decreasing function, when the absolute value of the high-frequency component is constant.

34. An apparatus for merging a plurality of data, according to claim 28, wherein the determining means determines the weighted coefficient, based on the amount of the high-frequency component.

35. An apparatus for merging a plurality of data, according to claim 34, wherein the determining means determines the weighted coefficient, based on the absolute value of the amount of the high-frequency component.

36. An apparatus for merging a plurality of data, according to claim 28, wherein the determining means determines, to be zero, the weight in a portion where the high-frequency component is present on a particular side with respect to a predetermined position in the synthesis area.

37. A medium for providing a program for merging a plurality of data, the program comprising:
   an extracting step of extracting at least one of a high-frequency component of first data and a high-frequency component of second data;

a setting step of defining a synthesis area which includes a portion of the first data and a portion of the second data; and a synthesizing step of determining a composite value of the first data and the second data in accordance with at least one of an amount of the high-frequency component of the first data and an amount of the high-frequency component of the second data, wherein the synthesizing step performs a synthesis process in the synthesis area.

* * * * *